(12) United States Patent
Youngers (10) Patent No.: US 6,524,471 B2
(45) Date of Patent: Feb. 25, 2003

(54) BACKWASH CONTROL SYSTEM FOR A FILTER UNIT USED IN A MACHINE TOOL SYSTEM

(76) Inventor: James Youngers, 18308 W. 79th St. S., Viola, KS (US) 67149

( * ) Notice: Subject to any disclaimer, the term of this patent is extended or adjusted under 35 U.S.C. 154(b) by 0 days.

(21) Appl. No.: 09/796,910

(22) Filed: Mar. 1, 2001

(65) Prior Publication Data

US 2002/0121485 A1 Sep. 5, 2002

(51) Int. Cl.[7] ............................................. B01D 35/143
(52) U.S. Cl. ..................... 210/85; 210/108; 210/139; 210/143; 210/171; 210/427
(58) Field of Search ............................. 210/85, 97, 106, 210/108, 138, 139, 143, 427, 167, 171

(56) References Cited

U.S. PATENT DOCUMENTS 5,328,597 A * 7/1994 Boldt et al.
6,235,209 B1 * 5/2001 Bratten

\* cited by examiner

Primary Examiner—Joseph W. Drodge
Assistant Examiner—Terry K. Cecil
(74) Attorney, Agent, or Firm—Shughart Thomson & Kilroy, P.C.; Mitchell L. Crain; Mark E. Brown (57) ABSTRACT

A filter unit in a fluid circuit associated with a machine tool that uses machining fluid is maintained by counting the number of times the machine tool is operated and automatically servicing the filter unit, as by backflushing, after the machine tool has been used a preset number of times. A filter unit control unit counts the number of uses of the machine tool and moves valve units in the filter unit from an operational configuration to a backwash configuration and controls the timing and operation of the filter unit maintenance cycle.

13 Claims, 6 Drawing Sheets

BACKWASH CONTROL SYSTEM FOR A FILTER UNIT USED IN A MACHINE TOOL SYSTEM

BACKGROUND OF THE INVENTION

Many machine tools, such as cutting or drilling tools, or the like, require a supply of machining fluid to the work area during a machining operation. This fluid often must pass through small openings and must be maintained as clean as possible to ensure proper flow rates as well as proper machining operations.

To this end, a filter unit is often included in many machining fluid flow circuits associated with machine tools. The filter unit conditions the machining fluid prior to that fluid being used in a machining operation.

However, if the filter unit does not effectively filter the machining fluid, such as because the filter unit is dirty or clogged or the like, the filtering process is impaired, if not vitiated. In some cases, a malfunctioning filter unit may actually require complete shutdown of the machining operation.

Therefore there is a need to maintain a filter unit in a flow circuit associated with supplying machining fluid to a machine tool during a machining operation as efficient as possible.

The filter art has several examples of systems for maintaining filter units in efficient operating condition. Some of these examples simply periodically replace the filter unit. While effective, this can be costly in time as well as in equipment.

Therefore there is a need to maintain a filter unit in a flow circuit associated with supplying machining fluid to a machine tool during a machining operation as efficient as possible without requiring replacement of the filter unit.

Another example monitors flow characteristics of fluid flowing through the filter unit and uses changes in these flow characteristics as indicators of filter unit degradation. Some of the flow characteristics commonly used include pressure drop across the filter unit, flow rates through the filter unit, viscosity of fluid flowing through the filter unit, and the like.

While monitoring flow characteristics is effective, it has several disadvantages that prevent it from being fully effective in maintaining a filter unit in the most efficient flow condition in the most effective and efficient manner.

For instance, flow characteristics may vary with the flow state conditions (such as temperature or the like) and a change of such indicia may mean that the fluid itself has changed or that the state of the fluid has changed and not the condition of the filter unit. This will, thus, provide an erroneous signal for a filter unit change or maintenance. Such an erroneous signal may result in an unnecessary filter unit change or maintenance cycle which may be inefficient, or worse, mask conditions in the filter unit itself thereby creating a situation in which a filter unit is not services when it should be.

Still further, using fluid flow characteristics as an indicia of filter unit operation or condition may require guesswork in determining when to initiate a filter unit maintenance cycle. For example, there may be a delay time between the pressure drop across a filter unit reaching a particular level and the filter unit actually being clogged beyond an acceptable level. The pressure drop signal may either lead or lag this unacceptable filter unit condition. The fluid flow circuit operator must rely on his or her experience when using fluid flow characteristics as an indicia for monitoring filter unit operation. Again, while this is somewhat efficient, it is not the most effective way to ensure proper filter unit operation. Furthermore, a control means that is energized in response to an activator stimulated by a condition sensor is subject to further inaccuracies associated with the condition sensor itself.

Some modern machining operations can be so precise and delicate that any contamination in the machining fluid beyond a very narrow range can be extremely detrimental. Accordingly, filter unit operation must be very accurate and precise and should not rely on human interpretation of data that may only be inferentially related to the actual condition of the filter unit to determine when a filter unit is operating at maximum efficiency.

Due to problems that may be associated with contaminated machining fluid in some modern machining operations, there is a need a need to maintain a filter unit in a flow circuit associated with supplying machining fluid to a machine tool during a machining operation as efficient as possible and which can carry out filter unit maintenance in a manner that can err on the side of initiating a maintenance cycle too often rather than not often enough, yet without being unduly wasteful of time and/or resources.

Still further, using inferential type data may require taking a filter unit off line during a machining operation or servicing the filter unit before it is absolutely necessary. Servicing a filter unit before it is necessary to do so may be ineffecient. Taking a filter unit off line during a machining operation would require replacing the filter unit and perhaps stopping a machining operation while the filter unit is removed and replaced, or using an alternative filter unit while the maintenance cycle on the subject filter unit is completed. In the first case, machining time may be lost; and in the second case, extra filter units must be available. In either case, the process is not as efficient as it could be and thus could be considered as being wasteful of time and/or resources.

Accordingly, there is a need to maintain a filter unit in a flow circuit associated with supplying machining fluid to a machine tool during a machining operation as efficient as possible and that does not require a filter unit to be taken off line during the maintenance operation.

SUMMARY OF THE INVENTION

The above-discussed disadvantages and drawbacks are overcome by initiating a backwash cycle of a filter unit in a flow circuit associated with supplying machining fluid to a machine tool during a machining operation based on the number of times the machine tool is used. That is, after a preset number of machine tool uses, the filter backwash cycle is automatically initiated before the next use of the machine tool.

As a result of this filter unit maintenance procedure, there is no need to take a filter unit off line for the maintenance since the filter unit is maintained during a machine tool regularly scheduled downtime. Hence, there is no need for a backup filter unit. Further, there is no need to interpret flow characteristic data to determine if the filter unit is in need of maintenance.

The number of machine tool uses can be set to any suitable value so an efficient filter unit can be ensured. Since the filter unit does not need to be removed from operation, the preset value of machine tool uses can be set to a very conservative value without unduly effecting machine tool overall use efficiency.

TECHNICAL FIELD OF THE INVENTION

The present invention relates to the general art of machine tools, and to the particular field of machine tools that include application of a fluent medium to the work or product.

OBJECTS AND ADVANTAGES OF THE INVENTION

It is a main object of the present invention to maintain a filter unit in a flow circuit associated with supplying machining fluid to a machine tool during a machining operation as efficient as possible.

It is another object of the present invention to maintain a filter unit in a flow circuit associated with supplying machining fluid to a machine tool during a machining operation as efficient as possible without requiring replacement of the filter unit.

It is another object of the present invention to maintain a filter unit in a flow circuit associated with supplying machining fluid to a machine tool during a machining operation as efficient as possible and which can carry out filter unit maintenance in a manner that can err on the side of initiating a maintenance cycle too often rather than not often enough, yet without being unduly wasteful of time and/or resources.

It is another object of the present invention to maintain a filter unit in a flow circuit associated with supplying machining fluid to a machine tool during a machining operation as efficient as possible and that does not require a filter unit to be taken off line during the maintenance operation.

It is another object of the present invention to maintain a filter unit in a flow circuit associated with supplying machining fluid to a machine tool during a machining operation as efficient as possible and that does not rely on interpretation of data that is only inferentially related to the condition of the filter unit to determine when a filter unit is in need of maintenance.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

As discussed above, in machine tools that use machining fluid, it is very important to maintain a filter unit associated with supplying machining fluid to the machine tool in proper working condition. As was also discussed above, this maintenance should be effected in a manner that does not require cessation of a machining process if possible yet can be carried out in the most efficient and expeditious manner and will keep the filter unit as efficient as possible.

In accordance with the teaching of the present invention, these, and the other objectives noted above, are met by monitoring the number of uses made by a machine tool and automatically initiating a filter unit maintenance cycle, such as a backwash, after a preset number of machine tool uses during a scheduled machine tool downtime and before the next machine tool use. In this manner, the filter unit does not need to be taken off line and a machining operation does not have to be interrupted for filter unit maintenance.

Figure 1:
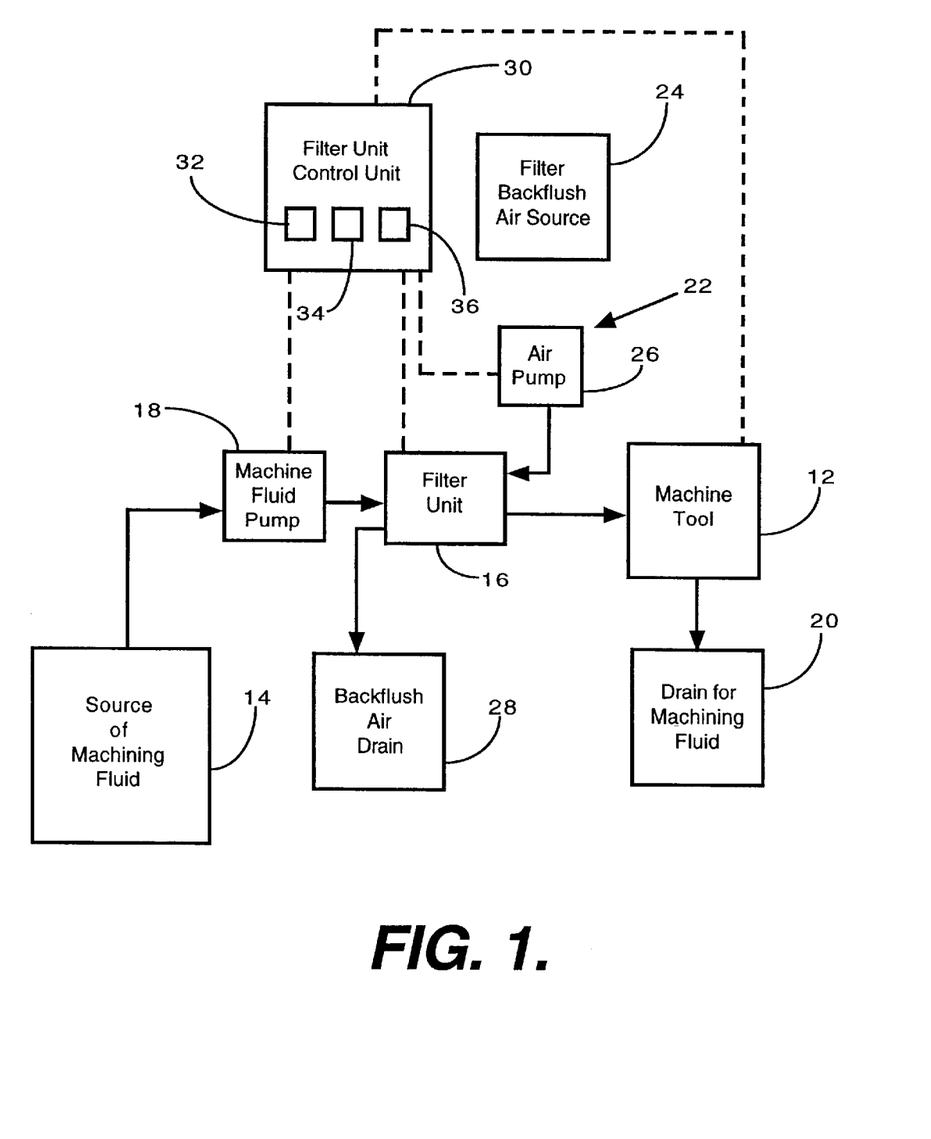
FIG. 1 is a block diagram showing the overall setup of the machine tool and filter unit as well as the maintenance control for the filter unit.

Referring to FIG. 1, a system 10 embodying the present invention includes a machine tool 12 of the type which uses machining fluid in a machining operation receives machining fluid from a source of machining fluid 14 via a filter unit 16. A machining fluid pump 18 moves the machining fluid from source 14 to filter unit 16 and provides sufficient pressure to move the fluid through the filter unit to and through machine tool 12. After use, the machining fluid flows to a drain 20 for reuse, cleaning or disposal, as suitable. Electrical connections are indicated in FIG. 1 by dashed lines and fluid connections by solid lines.

As discussed above, maintaining the filter unit in proper condition is important. Accordingly, system 10 of the present invention also includes a filter unit maintenance system 22 which includes a filter backwash system. Maintenance system 22 includes a source 24 of filter backwash fluid, such as air or the like, fluidically connected to filter unit 16 via a pump 26 that moves the backwash fluid from source 24 to and through filter unit 16, with used backwash fluid flowing to a backwash fluid drain 28 after that backwash fluid has passed through filter unit 16. The backwash fluid contained in drain 28 can be cleaned, re-used or simply discarded as suitable.

The present invention initiates filter maintenance, including filter backwash, when machine tool 12 has been operated a preset number of times. Accordingly, system 10 includes a filter unit control unit 30 that is electrically connected to machine tool 12, to filter maintenance system 22 and to machining fluid pump 18 to operate that pump in a manner that ensures proper flow of machining fluid in the operational direction from source 14 to and through machine tool 12 if desired or to simply monitor operation of the overall flow circuit if desired, and initiate flow of backwash fluid in the filter unit backwashing direction from source 24 to and through the filter unit to drain 28 after the machine tool has been operated a preset number of times such as five or ten or the like. Accordingly, control unit 30 includes a counter 32 electrically connected to machine tool 12 to count the number of times machine tool 12 has been operated and to generate a signal when that count reaches a preset number. For example, the counter can keep track of the number of on/off cycles of a power control associated with machine tool 12, and increase the count after every "off" signal. Control unit 30 further includes a valve controller 34 that is electrically connected to counter 32 and is operative to receive a signal generated by counter 32 and to be activated according to that signal. Controller 34 is also electrically connected to valve controllers in valve units in filter unit 16 to move those valve units between an operational configuration during which fluid flows through filter unit 16 from source 14 to machine tool 12 and a backwash configuration during which fluid flows through filter unit 16 from source 24 to drain 28. As those skilled in the filter art will appreciate from the teaching of the present disclosure, the backwash flow direction is opposite to the operational flow direction through filter unit 16.

Control unit 30 further includes a timer mechanism 36 is electrically connected to the pumps and valves associated with the system and the filter unit to ensure proper sequencing of the movement and operation of those valves and pumps in association with the operational and backwashing operations. For example, the timer mechanism prevents initiation of backwash fluid flow long enough to ensure that the valve units in filter unit 16 are configured in a backwash configuration. Timer mechanism also controls the duration of the backwash cycle and thus is appropriately electrically connected to pump 26.

Figure 2:
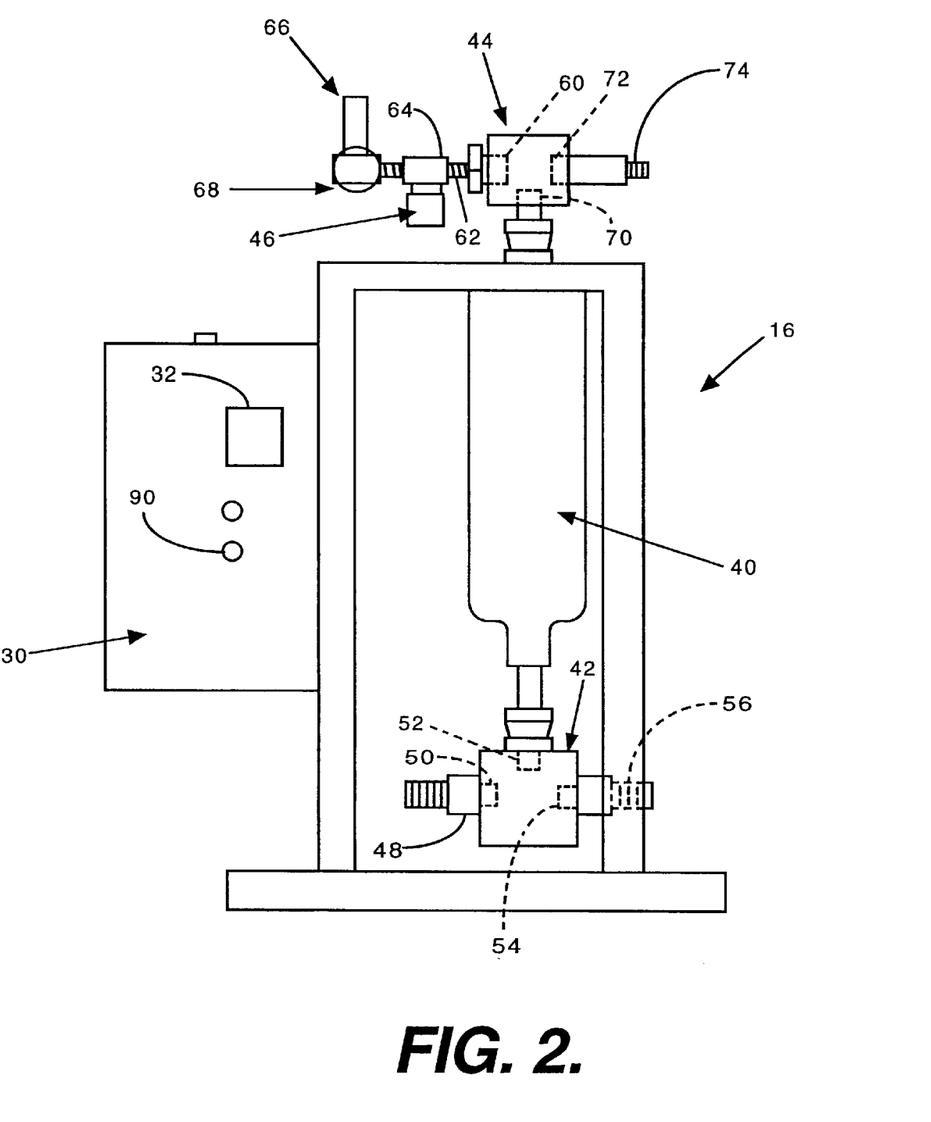
FIG. 2 shows the filter unit in association with the control unit associated therewith.

Referring to FIG. 2, it can be understood that filter unit 16 includes a housing 40 in which filter media are contained. Those skilled in the art will understand the type of filter media used and since the particular type of filter media is not considered as being part of the present invention, no discussion of the particular type of filter media will be presented. Filter unit 16 further includes valve units fluidically connecting the filter unit to the remainder of the fluid flow system. Thus, filter unit 16 includes a first valve unit 42 and a second valve unit 44 along with valve controllers, such as valve controller 46 on second valve unit 44, it being understood that valve unit 42 also includes a valve controller that is identical to controller 46 but is not shown in the interest of clarity. Valve units 42 and 44 are three-way solenoid controlled valves that include one port that can be fluidically connected to one of two other ports according to the position of a valve element that is controlled by a solenoid. Each of the first and second valve units 42 and 44 can be an inlet valve or an outlet valve depending on the flow condition through system 10. That is, first valve unit 42 functions as an inlet valve and second valve unit 44 functions as an outlet a valve when fluid is flowing in an operational direction from source 14 to machine tool 12; whereas, first valve unit 42 functions as an outlet valve and second valve unit 44 functions as an inlet valve when fluid is flowing in the backwash direction from source 24 to drain 28.

Figure 3:
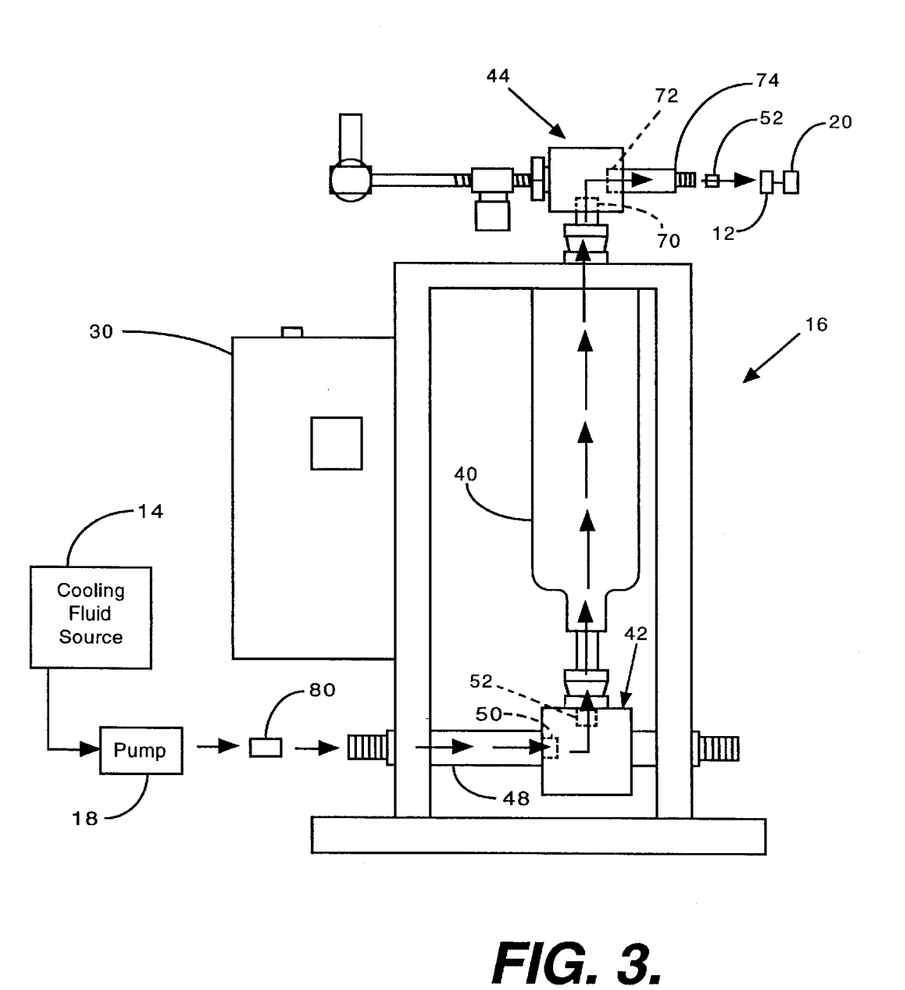
FIG. 3 shows the filter unit along with an indication of the fluid flowing through the filter unit in an operational configuration during which machining fluid is supplied to a machine tool during a machining operation.
Figure 4:
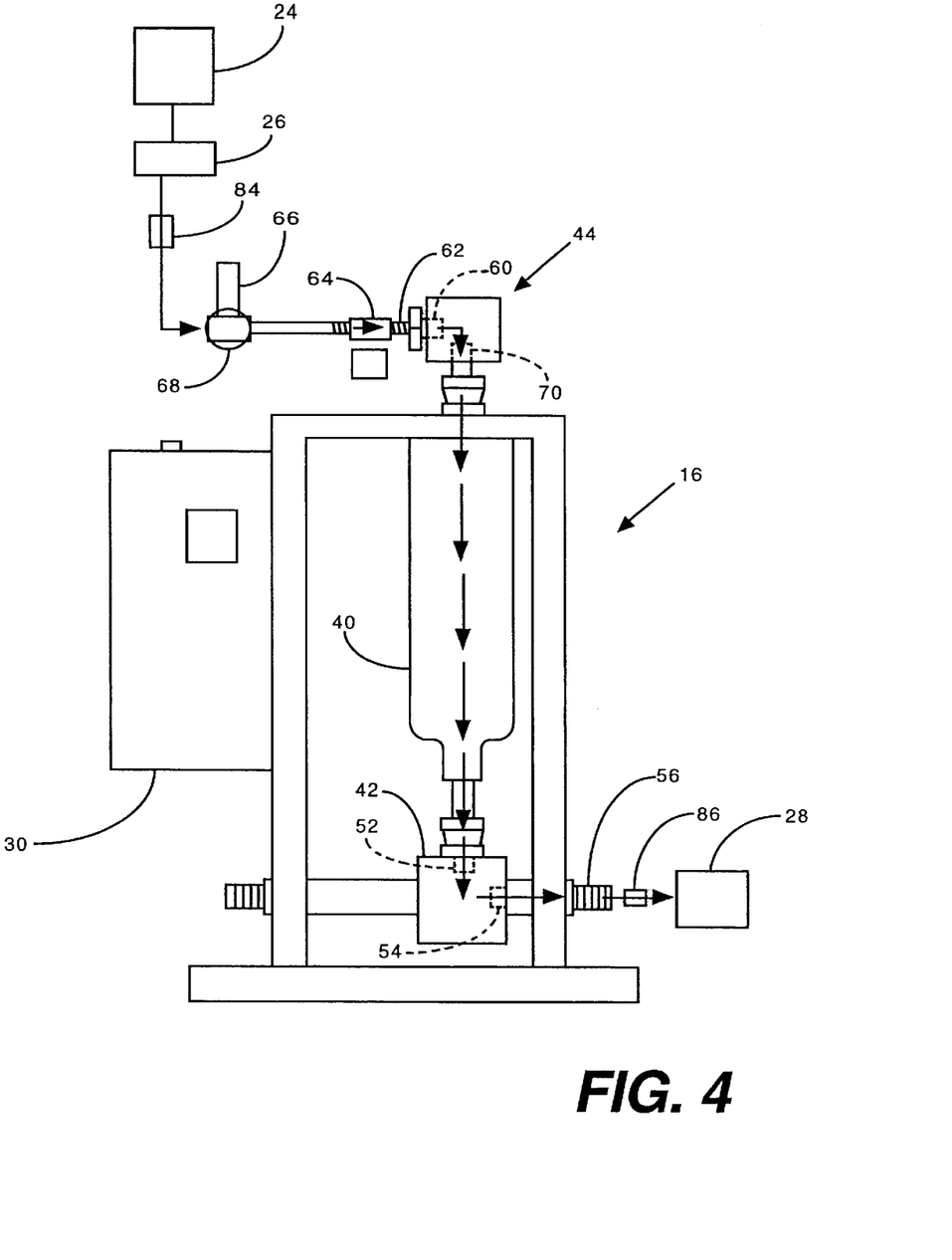
FIG. 4 is shows the filter unit along with an indication of the backwash fluid flowing through the filter unit in a backwash configuration during which backwashing fluid flows through the filter unit.

Therefore, as can be understood from the disclosure in FIGS. 2–4, first valve unit 42 includes an inlet nipple 48 fluidically connected to machining fluid pump 18 via a conduit (not fully shown in FIGS. 2, 3 and 4) that is connected to an inlet port 50 of first valve unit 42 and two additional ports, one port 52 fluidically connected to the filter media in housing 40 and one port 54 fluidically connected to backwash fluid drain 28 via a nipple 56 that is connected to a conduit (not fully shown in FIGS. 2, 3 and 4). A solenoid control moves the valve element to fluidically connect ports 50 and 52 during an operational flow condition as indicated in FIG. 3, and to reconfigure the ports to have ports 52 and 54 fluidically connected to each other during a backwash condition as indicated in FIG. 4. Signals to the solenoid associated with valve 42 are received from control unit 30 via suitable electrical connections.

As can be seen in FIGS. 2–4, second valve unit 44 is a solenoid controlled three-way valve that is identical to the just-described first valve unit 42. Thus, second valve unit 44 includes an inlet port 60 connected by a nipple 62 to a valve control 64 to receive backwash fluid, such as air, from backwash system 22. An air regulator 66 and a pressure gauge 68 can also be included in the control for second valve unit 44. As is the case with first valve unit 42, second valve unit 44 is a three-way valve with inlet port 60 being fluidically connected to port 70 during a backwash cycle as shown in FIG. 4 so backwashing fluid flows from source 24 via fluidically connected ports 60 and 70 into and through the filter media contained in housing 40 and then on to drain 28 via fluidically connected ports 52 and 54 of first valve unit 42 as shown in FIG. 4. Second valve unit 44 also includes a port 72 that is fluidically connected to machine tool 12 via a conduit (not fully shown in FIGS. 2, 3 and 4) that is connected to valve unit 44 by a nipple 74 whereby machining fluid flows from source 14 through filter unit 16 and then on to machine 12 via the fluidically coupled ports 70 and 72 as shown in FIG. 3. As was the case with first valve unit 42, second valve unit 44 is appropriately connected to control unit 30 whereby the timing and movement of the valve port control element to fluidically couple ports 60, 70 and 72 as necessary to establish the operational flow circuit associated with FIG. 3 or the backwash flow circuit associated with FIG. 4 is controlled and established.

As can be understood from FIG. 3, an operational flow condition for system 10 has first valve unit 42 configured with ports 50 and 52 fluidically connected together to conduct machining fluid from source 14 via conduit 80 and nipple 48 to the filter media in filter unit housing 40 to second valve unit 44 which has ports 70 and 72 in configured in fluid communication with each other and with outlet conduit 82 via nipple 74 to conduct machining fluid from filter unit 16 to machine tool 12 and then to drain 20.

Counter 32 tracks the number of times machine tool 12 is operated, and when that count equals a preset number, generates a signal to valve units 42 and 44 to reconfigure the ports therein into a backwash configuration as shown in FIG. 4. It is noted that no signal needs to be sent to pump 18 because that pump is not operating since the backwash process associated with system 10 does not occur until after machine tool 12 has been shut down because counter 32 counts the number of times the machine is used and then activates the maintenance cycle after the machine has been used a preset number of times.

After a selected delay to ensure that the ports are configured in a backwash configuration, a delay of one-half second in the preferred mode, the backwash process is initiated. In the backwash flow condition, second valve unit 44 is configured with ports 60 and 70 in fluid communication with each other to conduct backwash fluid from source 24 via conduit 84 and nipple 62 into the media contained in filter unit 16. First valve unit 42 is configured to have ports 52 and 54 in fluid communication with each other so fluid flowing from the filter media is conducted to nipple 56 and via conduit 86 to drain 28. Timer 36 through appropriate electrical connections controls the duration of the backwashing, and at the end of the selected time, generates a signal to control unit 30 to stop pump 26 and to valve controller 34 to move the first and second valve units back into the operational configurations. The filter unit control unit can include interlocks that prevent operation of pump 18 during a backwash process and which prevent operation of pump 26 during an operational process if desired.

Figure 5:
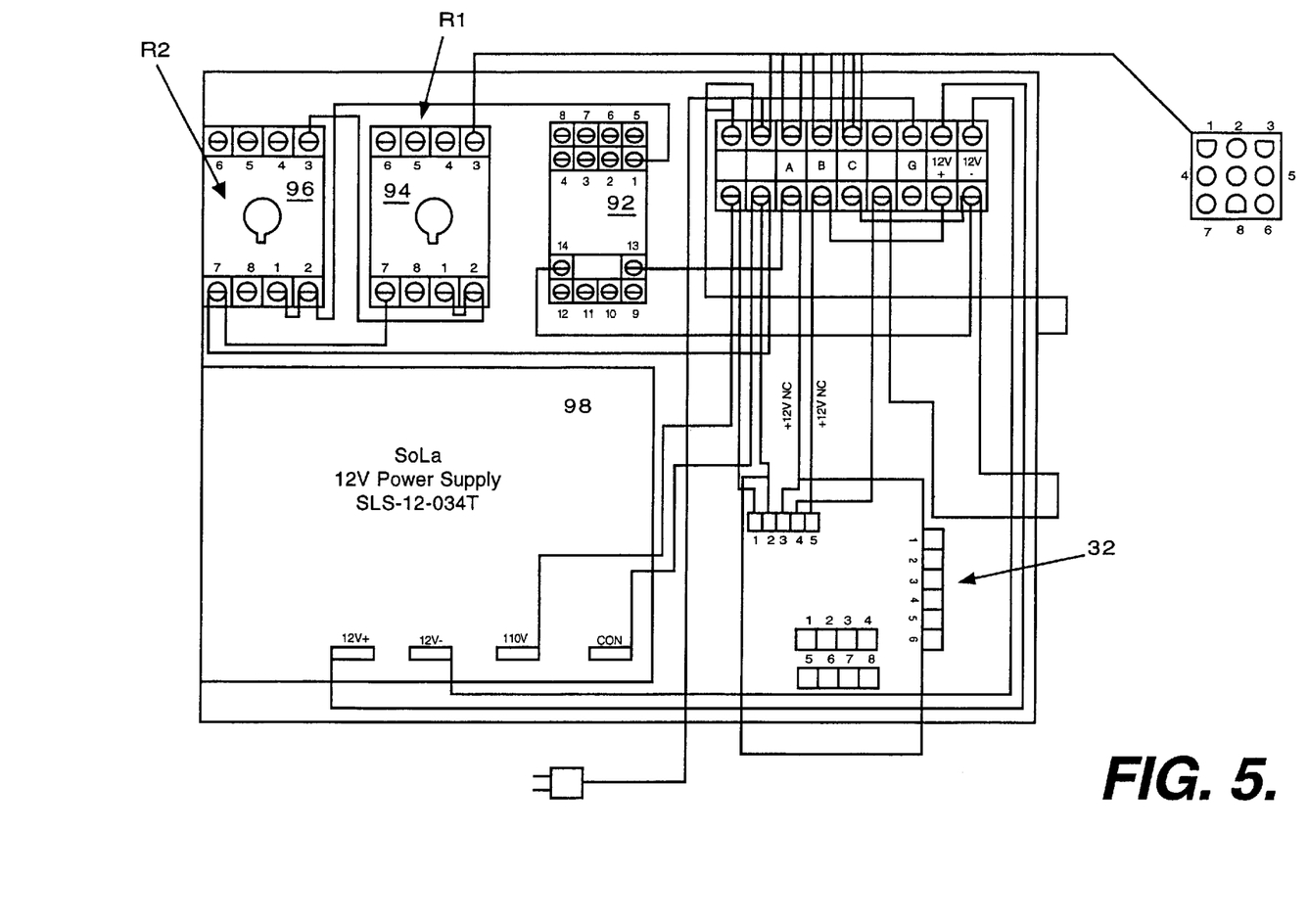
FIG. 5 is an overall circuit diagram showing the electrical connections between the machine tool use counter, the relays, the valve controllers and the timer required to monitor the machine tool and effect a filter unit backwash cycle in accordance with the teaching of the present invention.

The precise electrical connections and electrical elements necessary to carry out the above-discussed operations are not part of the present invention, and one skilled in the art can understand what electrical elements and what circuits are necessary to carry out the invention. Accordingly, no detailed discussion of such elements and circuits will be presented. It is noted that the preferred form of the circuit is indicated in FIG. 5 and control unit 30 is connected to machine tool 12 via a signal cord 90. The preferred form of the invention includes a controller manufactured by Red Lion Corporation which receives a signal from the machine and sends a twelve volt signal to Idec relay 92 which applies power to relay 94. Relay 94 delays power "on" for one-half second and then applies power to relay 96 which causes backwash operation for two and one-half seconds then turns off the power. The circuit is set for three second delay which then powers off and is reset for the next backwash cycle. Also, the three-way valve units are each operated by the Red Lion controller. Counter 32 is also shown in FIG. 5 as is the power supply 98.

Air regulator 66 in the preferred form of filter unit 16 is manufactured by Speedaire as part number 52419A, the solenoid valves are manufactured by Dayton Valve Company under part numbers 1A575 and 3A440, while valves 42 and 44 are manufactured by Spraying Systems Company as model number 344AE.

Figure 6:
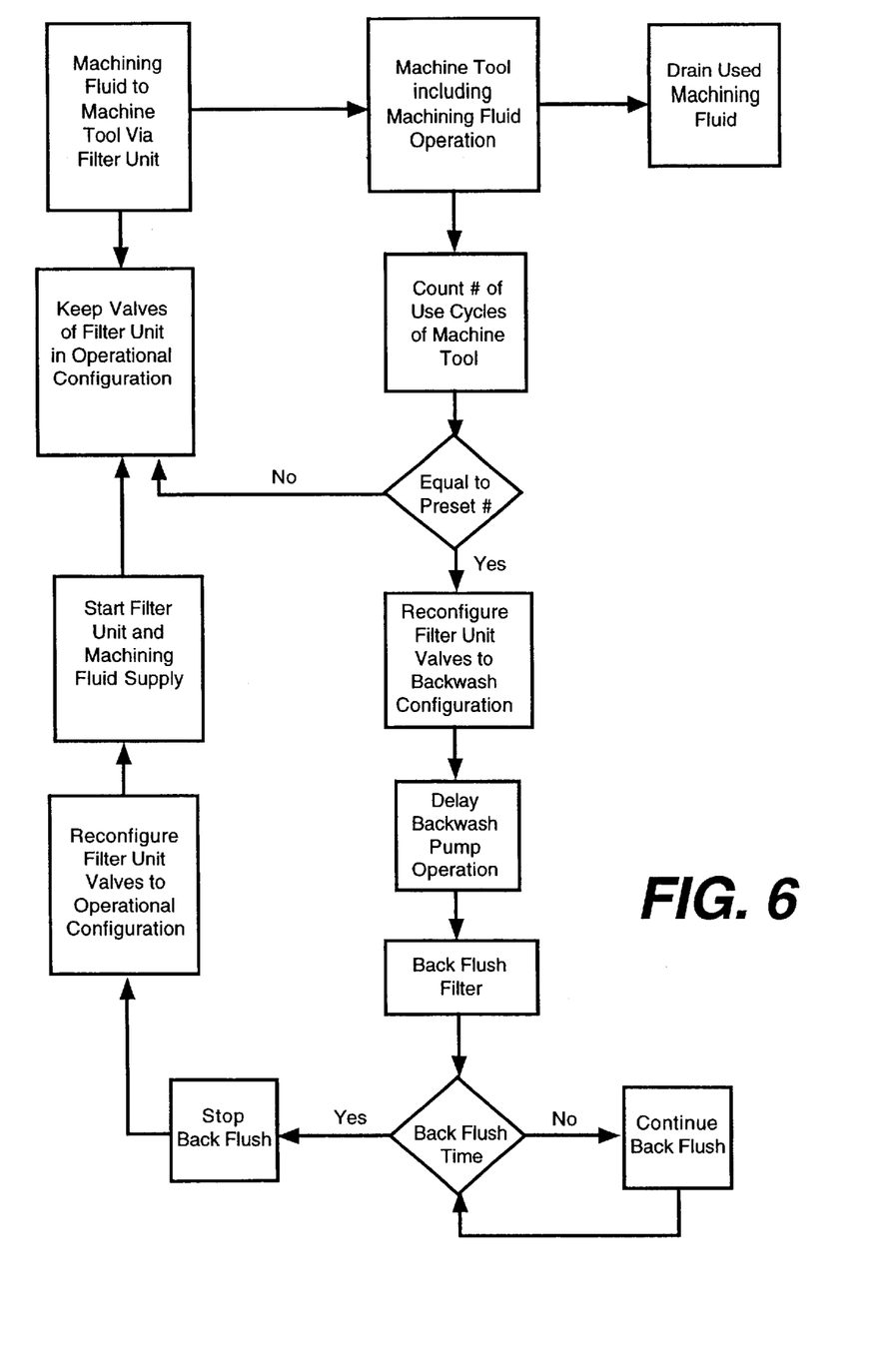
FIG. 6 is a flow chart indicated the procedure used in monitoring machine tool use and controlling filter unit maintenance according to the number of uses of the machine tool associated with the filter unit.

Having described the system, the operation of the system is indicated in FIG. 6. The machine tool is operated and machining fluid is conducted to and from that machine tool during operation. The number of times the machine tool is operated is counted and after a preset number, for example ten, the system is reconfigured to a backwash condition. After a delay to ensure proper valve and port configuration, the backwash process is conducted for a selected period of time. After the selected time, the backwash pump is stopped, and the valve units and ports of the filter unit are reconfigured back into the operational condition and the filter unit is again ready for operational flow when the machine tool is activated.

It is to be understood that while certain forms of the present invention have been illustrated and described herein, it is not to be limited to the specific forms or arrangement of parts described and shown.

What is claimed and desired to be secured by Letters Patent is as follows:

1. A filter system for use in a machining fluid supply system associated with a machine tool comprising:
    a filter unit fluidically connecting a source of machining fluid to a machine tool which uses the machining fluid;
    a first valve unit on said filter unit, said first valve unit being configurable in an operational flow configuration which permits flow of machining fluid in an operational flow direction through said filter unit towards the machine tool and a backwash flow configuration which permits filter backwashing fluid to flow through said filter unit in a direction opposite to the operational flow direction;
    a second valve unit on said filter unit, said second valve unit being configurable in the operational flow configuration and the backwash flow configuration;
    a counter connected to the machine tool and counting the number of times the machine tool is used and generating a signal when the machine tool has been used a preset number of times;
    a valve unit controller connected to said counter and moving said first and second valve units between operational and backwash flow configurations in response to the signal received from said counter; and
    said valve unit controller being connected to said counter to move said first and second valve units from their operational configurations into their backwash configurations after the machine tool has been used a preset number of times.

2. The filter system defined in claim 1 further including a timer connected to said valve unit controller.

3. The filter system defined in claim 2 wherein said timer includes a delay circuit.

4. The filter system defined in claim 3 wherein said timer is set to cause a flow of backwashing fluid after a delay of 2–3 seconds after said valves have all been moved into their backwash configurations.

5. The filter system defined in claim 4 wherein said counter is set to cause a flow of backwashing fluid after the machine tool has been used ten times.

6. A fluid supply system for use with a tool unit, such as a machine tool, which uses machining fluid during operation comprising:
    a source of machining fluid used in a machine tool machining operation;
    a drain fluidically connected to the machine tool and receiving machining fluid used in a machining operation after the fluid has been used;
    a filter unit fluidically connected to said source of machining fluid and to the machine tool filtering machining fluid as it flows in an operational direction through said filter unit from said source of machining fluid to the machine tool;
    a first valve unit on said filter unit, said first valve unit being configurable in an operational flow configuration which permits flow of machining fluid in the operational flow direction through said filter unit and a backwash flow configuration which permits flow of fluid through said filter unit in a direction opposite to the operational flow direction;
    a second valve unit on said filter unit, said second valve unit being configurable in the operational flow configuration and the backwash flow configuration;
    a source of filter backwash fluid which flows through said filter unit in the backwash flow configuration direction to backwash said filter element, said source of filter backwash fluid fluidically connected to said second valve unit; and
    a filter unit control unit connected to said filter unit and to the machine tool and including
        a counter connected to the machine tool and advancing a control count each time the machine tool is operated and which generates a signal when the count reaches a preset number, and
        a valve control unit connected to each of said first and second valve units and to said counter and operative to receive the signal generated by said counter to configure said first and second valve units into their operating configurations when said control count is less than a preset number of counts and to re-configure said first and second valve units into their backflush configurations upon receiving the signal from the counter when said control count is equal to said preset number.

7. The fluid supply system defined in claim 6 wherein said control unit of said filter unit includes a timer unit.

8. The fluid supply system defined in claim 7 wherein said control unit further includes a delay circuit.

9. The fluid supply system defined in claim 6 wherein said first and second valve units are three-way solenoid controlled valves.

10. The fluid supply system defined in claim 7 wherein machine tool operation includes a cycle of activation of the machine tool and de-activation of the machine tool.

11. The fluid supply system defined in claim 8 wherein said timer is set to delay initiation of flow of backwash fluid to said filter unit for at least one-half second after said first and second valve units have been moved from their operational flow configuration to their backwash flow configuration.

12. The fluid supply system defined in claim 11 further including a backwash fluid pump.

13. The fluid supply system defined in claim 12 wherein said timer is set to deactivate the flow of backwash fluid to said filter unit after ten seconds of operation of said backwash pump.

* * * * *